United States Patent [19]

Moritoki et al.

[11] Patent Number: 4,784,766
[45] Date of Patent: Nov. 15, 1988

[54] PRESSURE CRYSTALLIZATION EQUIPMENT

[75] Inventors: Masato Moritoki, Miki; Kazuo Kitagawa, Kobe, both of Japan

[73] Assignee: Kabushiki Kaisha Kobe Seiko Sho, Kobe, Japan

[21] Appl. No.: 939,160

[22] PCT Filed: Sep. 18, 1985

[86] PCT No.: PCT/JP85/00520
§ 371 Date: Nov. 12, 1986
§ 102(e) Date: Nov. 12, 1986

[87] PCT Pub. No.: WO87/01605
PCT Pub. Date: Mar. 26, 1987

[51] Int. Cl.[4] .............................................. B01D 35/02
[52] U.S. Cl. ..................................... 210/181; 210/315; 210/489
[58] Field of Search ............... 210/499, 443, 496, 489, 210/315, 181, 340

[56] References Cited

U.S. PATENT DOCUMENTS 1,908,925 5/1933 Semon et al. ...................... 210/443
2,346,018 4/1944 Fulton ................................. 210/151
3,190,450 6/1965 Stoller et al. ...................... 210/179
3,201,858 8/1965 Valyi ............................. 210/496 X

FOREIGN PATENT DOCUMENTS

2140235 1/1973 France .
54-157773 12/1979 Japan .

Primary Examiner—Frank Spear
Attorney, Agent, or Firm—Oblon, Fisher, Spivak, McClelland, & Maier

[57] ABSTRACT

Pressure crystallization equipment which effects segregation by the use of pressure as a variable, particularly characterized in that after crystallization has occurred, the separation of a solid from the mother liquid is safely effected irrespective of the high pressure by providing a filter structure made of a cylindrical metal mesh layer structure and a cylindrical reinforcing member backing it up.

9 Claims, 7 Drawing Sheets

PRESSURE CRYSTALLIZATION EQUIPMENT

FIELD OF THE INVENTION

The present invention relates to pressure crystallization equipment for causing a liquid to become solid at high pressures, such as 500 atms or more, and more particularly to equipment for use in solidifying a liquid content under such high pressures and separating it in the form of a solid from the mother liquid mixture.

BACKGROUND OF THE INVENTION

When two or more substances are present in a liquid state or in a slurry state (hereinafter referred to as the liquid mixture), there have been many chemical methods for separating a particular content from the other contents. However, the conventional methods are not effective to separate one particular content from others when the contents are eutectic or form a solid solution, where the contents are so similar in chemical and physical properties that they are difficult to separate. As a result the common practice is to effect the separation of contents at particular temperatures, which will be referred to as cooling crystallization. This includes a cooling method under which a particular content is separated at its freezing point from the others.

However cooling crystallization has some disadvantages; for example, (1) it is difficult to control the temperature, (2) temperature gradients are likely to occur in the system, thereby preventing the achievement of thermal equilibrium and (3) the operational time is prolonged.

Therefore the inventors have started to solve the problems encountered in cooling crystallization and have developed a crystallization process utilizing pressure instead of heat, hereinafter referred to as pressure crystallization equipment.

As the pressure crystallization method is operated for commercial purposes, particularly using large-scale equipment, new problems have arisen. One of them is how to discharge the liquid phase out of the system under a high pressure when the liquid and solid phases co-exist as a mixture therein.

Under the pressure crystallization method with the rise in pressure the crystallization proceeds, whereas as the pressure is decreased the crystals melt or become soft. As equipment a cylindrical highpressure vessel is used, which is provided with a filter on its inside wall. Behind the filter the system is communicated with the atmosphere wherein the communication is blocked by means of a valve when it is intended to allow liquid and solid phases to co-exist. There are many modifications to it.

In operation a mixture in a liquid state is put in the vessel; the communication with the atmosphere is blocked and the discharge of a liquid is closed, which means that the vessel is completely closed. A high pressure is applied to the mixture in the vessel; if necessary, the temperature is reduced. In this way the particular content is crystallized in the mixture, thereby producing a state in which the particular fraction of crystals and the remaining liquid co-exist. Then the valve is opened so as to withdraw the liquid content, which is forced out through the filter by applying pressure to the mixture in the vessel. The pressure is continuously applied to the remaining solid phase so as to squeeze it and force the remaining liquid through the filter. In this way a highly pure content remains in the vessel.

Figure 1:
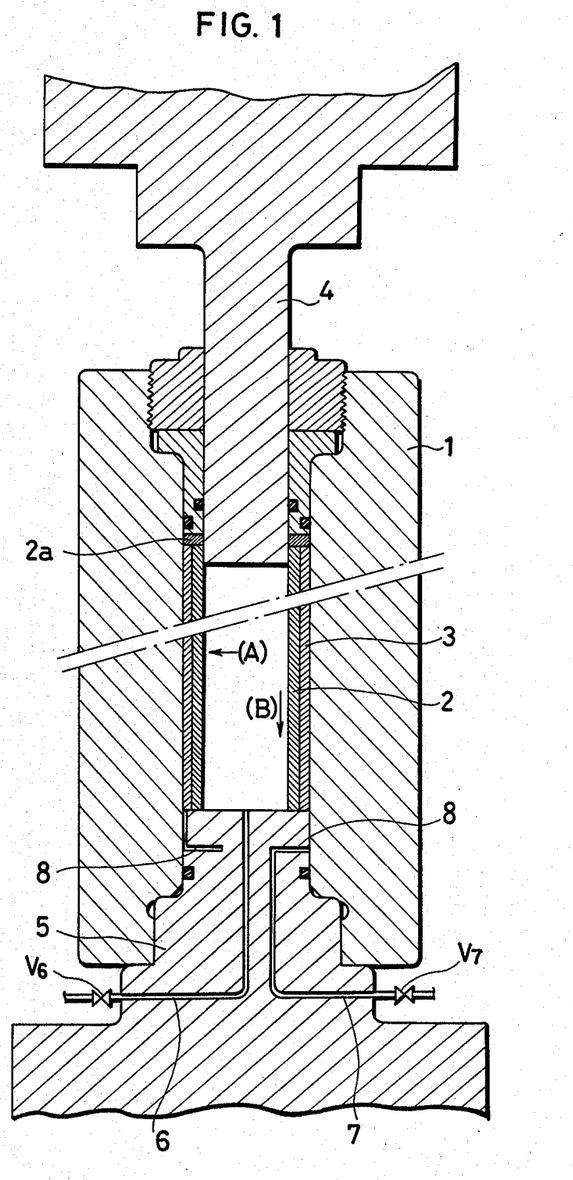
FIG. 1 is a vertical cross-section through pressure crystallization equipment made by the inventors of the present application.

Reference will be made to FIG. 1, which shows an example of a conventional high-pressure vessel. The vessel 1 has as filter 2, a thermal insulating material 3, a piston 4, a bottom closure 5, a mixture supply pipe 6, and a discharge pipe 7.

The steps taken to operate the illustrated vessel are as follows:

(1) A valve V7 is closed and the valve V6 is opened so as to allow the mixture to enter the vessel 1;

(2) After the supply of mixture is completed the valve V6 is closed, and the piston 4 is caused to descend, thereby causing an increased pressure upon the mixture in the vessel. In this way the crystallization of a particular content is promoted;

(3) After the crystallization is finished the valve V7 is opened and the subsequent filtering and squeezing start; that is, first, the liquid content in the vessel is squeezed, and caused to pass through the filter. The fluid content passes through a path 8, and is discharged through the pipe 7 via the valve V7; and (4) After the filtering and squeezing are finished, the vessel 1 is opened, the solid cake at the atmospheric pressure is taken out or alternatively, is melting for recovery.

In the process (3) mentioned above the filter 2 is subjected to as high pressures as 500 atms or more, sometimes a few thousands atms, in the direction of arrow (A), that is, perpendicular to the filter surface. In addition, as the squeezing advances, the filter surface is subjected to a frictional force involved in squeezing the solid cake wherein the frictional force acts on the filter surface in the dirction of arrow (B), that is, in the axial direction. Furthermore, a differential pressure between the high internal pressure acting on the upper ring 2a and a possible atmospheric pressure thereunder affects the filter surface. Owing to these combined factors the filter is in danger of compressible deformation in the direction of arrow (B), and sometimes in danger of expanding deformation in the direction of arrow (A); sometimes, the filter breaks owing to the expanding deformation. When the filter is made of a sintered metal (SUS or the like) having a simple structure it often happens that the pores in the filter are crushed and clogged, thereby losing the filtering ability.

As described above the conventional pressure segregation method has a great disadvantage of filter fracture and/or lost filtering ability. This leads to a reduced efficiency in the form of low yields or the reduced purity of a collected content.

In order to solve these problems occurring in the process of filtering and squeezing it is essential to develop a cylindrical filter strengthened radially as well as axially.

In order to overcome the difficulty mentioned above the inventors have made an invention for which a patent application No. 59(1984)-50108 has been filed. In this invention the upper portion of the inside wall of the filter is fixed to the ring, and the filter is backed up by a reinforcement and fixed at a given place in the vessel so as to protect the filter against axial deformation.

Figure 2:
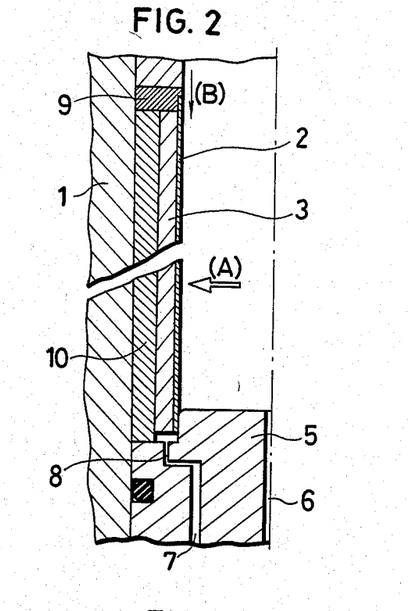
FIG. 2 is a vertical cross-section showing the filter structure shown in FIG. 1.

As is shown in FIG. 2 the entire structure is substantially the same as the embodiment of FIG. 1. A ring 9 is fitted in a space above the filter 2 and a cylindrical reinforcement 10 is provided behind the filter 2 through a thermal insulating material 2. The reinforcement 10 is so constructed that its length can be adjusted in accordance with the axial length of the filter so as to locate the upper ring 9 at a desired position. The reinforcement 10 can be cylindrical when the insulating material 3 is interposed against the filter 2 or vertically split for facility of attachment and detachment. The insulating material 3 has a structure which permits the liquid to pass therethrough toward the discharge path 8. When no insulating material 3 is interposed, it is necessary to provide a vertical slit whereby the liquid is permitted to flow after having passed through the filter 2.

The size of the slit must be determined so as to reinforce the filter structure in the axial and radial directions. It is possible to make the ring 9 in one body with the reinforcement 10.

In this way the filter 2 is fixed at a particular place with the ring 9 and reinforcement 10, and if it is additionally backed up by the reinforcement 10 the filter 2 is protected against deformation in the directions of arrows (A) and (B) and against its pores being crushed or expanded. Thus the high yield and the purity of a collected component are ensured. Because the filter 2 is protected against becoming damaged the frequency of replacing the filter with a new one is considerably reduced.

Figure 3:
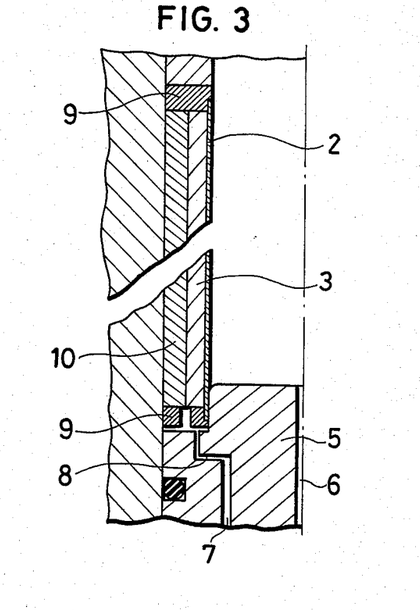
FIGS. 3 and 4 each are modified versions of the pressure crystallization equipment of FIG. 1, each corresponding to FIG. 2.

FIG. 3 shows another embodiment of the previous invention, which is characterized in that the filter 2 is fixed at its upper and lower ends by means of rings 9 with the reinforcement 10 interposed therebetween. Owing to the rings provided at both ends the filter 2 is safely protected against compressive and expanding deformation.

Figure 4:
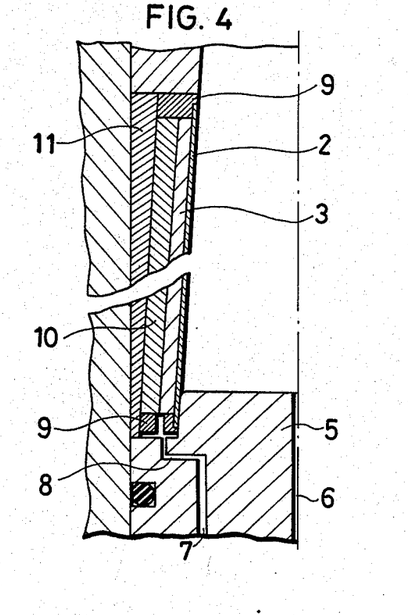

FIG. 4 shows a further example of the embodiment. In this example the cylindrical filter 2 has a progressively divergent wall, that is, a tapered wall. The reinforcement 10 and the insulating material 3 are equally shaped, and they are provided between the upper and lower rings 9, with a spacer 11 being provided in the outermost layer. The spacer 11 is cotter-shaped in cross-section as shown in FIG. 4.

Figure 5:
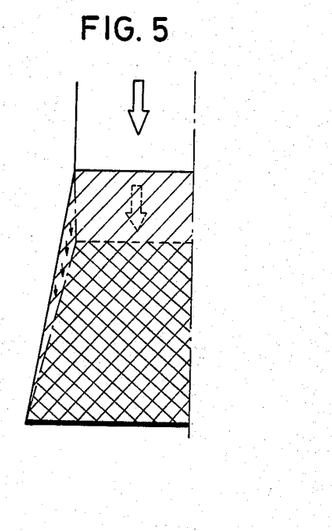
FIG. 5 is an explanatory view exemplifying the process of squeezing operated under the equipment of FIG. 4.

In order to prevent the filter from becoming deformed along its circumference it is necessary to minimize the space between the insulating material 3 and the reinforcement 10 located behind the filter 2. In the examples shown in FIGS. 1, 2 and 3 where the filter 2 is purely cylindrical, the minimized space is almost impossible when the facility of inserting the filter is taken into consideration. The embodiment shown in FIG. 4 has solved this difficulty. Spacer 11 functions as a wedge, thereby placing the reinforcement 10 into tight contact with the back of the filter 2 to the extent that no space is produced therebetween. In addition the filter is prevented from becoming deformed in a radial direction. When the filter 2 is to be removed the block 5 has only to be pushed downward. In the process of squeezing, the filter 2 is subjected to a downward frictional force. As shown in FIG. 5 (the straight line shows a pre-squeezing state and the broken line shows an under-squeezing state) the solid cake is subjected to a force whereby it is urged to separate from the inner surface of the filter 2, which means that the friction lessens. The solid cake is squeezed when it is in the state shown by the broken line in FIG. 5 as it is subjected to a series of buckling fractures during which a liquid path is produced inside the cake, thereby facilitating the separation of liquid and solid.

In the embodiments mentioned above the filter is made of sintered metal mesh, but the material is not limited thereto: mono- or multi-layer metal mesh, a porous plate, a laminated sintered material, a piece of canvas or their combination can be selected in accordance with the pressure and the nature of the treating material.

The results of the research conducted prior to the present invention have been described as the background of the present invention. The contents of the research has not yet been published and is not available to the public. Under the new pressure crystallization method the filter sometimes has fractured and a clogging trouble has occurred. There has been a strong demand for an improved pressure segregation method and equipment.

The next problem is how to control the temperatures during the operation.

The pressure segregation method uses pressures as a variable, but heat is unavoidably generated and it is necessary to control the temperatures so as to minimize the influence of heat. In order to carry out the pressure crystallization method efficiently it is essential to control the temperatures likely to rise in the course of operation. One solution is to place the mixture kept at lower temperatures in the vessel. However in the processes (2) and (3) heat is likely to generate and the temperature in the vessel instantaneously rises by 10 degrees or more. The wall of the vessel has such a large heat capacity that the heat generated is absorbed in the wall, thereby restraining a further rise in the temperature. As the heat radiates, the temperature lowers. As a result there arises temperature gradient in the vessel, which results in uneven segregation. In such situations the collecting liquid content is likely to crystallize in large quantity on and around the filter and/or in the discharge path, thereby preventing the smooth separation of liquid and solid contents. There is another solution, that is, the pressure in the vessel is slightly reduced so as to melt the crystals of lower purity, and enhance the purity of the collected solid content. When the pressure is reduced in this way the treated substances tend to have lower temperatures than the filter and the inside wall of the vessel, which may lead to the excessive melt of solid phase to change it.

The temperature gradient is an important problem in that (1) it is likely to impair the purity of a collecting content because of a possible crystallization of other than the desired content, (2) the discharge path is likely to become clogged, thereby reducing the performance of the filter, and (3) the crystals of the particular content are likely to melt, thereby resulting in a reduced yield.

The above-mentioned problems are amplified by daily and seasonal changes in temperature which affect the temperature of the vessel, thereby requiring a strict control of the temperatures of the vessel.

However the control of temperature is very complicated, and is a labor- and money-consuming work. In addition the vessel unavoidably has a large heat capacity because of its construction of thick metal. This makes the control of temperature difficult. One solution is that the vessel is constructed such that heat transfer between the wall of the vessel and the inside thereof is minimized. The embodiments shown in FIGS. 1 to 4 have achieved this solution to some extent.

Another difficulty is how to take out solid cakes remaining in the vessel after the filtering and squeezing have been finished. When the vessel is purely cylindrical having an equal diameter along its entire length, a high pressure such as 500 atms or more than 1,000 atms acts on the inside of the filter. Such a high pressure can break not only the inside of the filter but also expand the wall of the vessel. Under this situation the particular content to be collected is tightly packed in a solid cake in the vessel after the squeezing has been finished. At this stage the piston is raised so as to release the high pressure and restore a normal atmospheric pressure in the vessel. Then the piston is again lowered, or the vessel is lifted up against the piston, so as to push the solid cake. However when the pressure is reduced to the normal pressure as mentioned above, the wall of the vessel tends to restore its original capacity. As a result the solid cake is tightened along its circumference, thereby placing it into tight contact with the inside surface of the filter. In this situation if the solid cake is too strongly pushed by the piston toward the bottom of the vessel a large friction acts in between the solid cake and the filter, thereby damaging the inside surface of the filter. Thus the life of the filter is shortened. Frequent replacement will be necessary. To solve this problem one way is to use a thick filter, which, however, leads to a high cost. In this respect the embodiment of FIG. 4 has been found effective.

There is a further problem encountered in the separation of a liquid content from the liquid/solid mixture:

The liquid content is kept at a high pressure, and when it is discharged to a low-pressure side through the filter and the discharge pipe, there arise a sudden drop in pressure, which transfers to the solid phase in the vessel. As a result the solid phase begins to melt, thereby reducing the working efficiency. Therefore it is necessary to keep the high pressure in the vessel as extensive as possible. One basic idea is to provide a pressure buffering chamber such as a hatch. On the basic of this idea there are (1) a method of using a pump connected to the high-pressure side, whereby the high-pressure liquid is pumped as it is at the high pressure from the solid phase, and then it is withdrawn to the low-pressure side, or alternatively, (2) a method of placing a anti-pressure device of the same type and size as the pressure segregation equipment at a place adjacent thereto. As evident from the description these methods are disadvantageous in being costly and complicated.

At any rate it is difficult to take out a high-pressure liquid content to a low-pressure side while the liquid is being kept at the high pressure, and it is essential to develop an equipment achieving this difficult task.

In association with the above-mentioned difficulty there is a problem of clogging in the discharge path owing to the high-pressure-unavoidably acting on the discharge path thereby to produce crystals under the influence of the pressure. When the clogging occurs in the discharge path is is necessary to melt and remove the crystals by an extra step. This is also a time- and labor-consuming work. The regular course from supply of material to discharge of the product takes a few minutes, and in normal operation the process is continuously repeated day and night. If the discharge path clogs, the regular course of operation is broken. The working efficiency is considerably reduced. In order to solve this problem one solution is to heat the entire equipment at a certain temperature. This requires a lot of heat energy, which reflects in the high production cost. In addition if heat is added to the total equipment it must be covered with an insulating material so as to keep the heat, thereby making it difficult to observe from the outside. For example it is difficult to inspect a liquid leak in the couplings or joints in the equipment.

As has been so far pointed out the conventional pressure crystallization method and equipment have many problems arising after the crystallization has taken place, and the present invention aims at solving them and increasing the efficiency of separating a particular content from the remaining liquid mixture.

SUMMARY OF THE INVENTION

An object of the present invention is to provide an improved pressure crystallization equipment which is free from filter fracture and clogging likely to occur owing to the high pressure given in the squeezing process.

Another object of the present invention is to provide improved pressure crystallization equipment in which heat transfer is minimized between the wall of the vessel and the inside thereof.

A further object of the present invention is to provide improved pressure crystallization equipment which allows the solid cake to be readily removed from the remaining mixture without damaging the filter.

A still further object of the present invention is to provide improved pressure crystallization equipment which discharges a liquid content from a high pressure side to a low-pressure side.

Other objects and advantages of the present invention will become more apparent from the following description when taken in conjuntion with the accompanying drawings which shows, for the purpose of illustration only, one embodiment in accordance with the present invention.

According to one aspect of the invention there is provided pressure crystallization equipment which comprises:

a cylindrical high pressure vessel having an inner surface;

means for establishing a pressure of at least 500 atmospheres within said vessel; and a filter structure disposed within said vessel and being fixed against substantial radial and axial displacement with respect to said vessel, said filter structure comprising a cylindrical metal mesh structure having at least two layers of mesh sintered together and a reinforcement disposed between said cylindrical metal mesh structure and said inner surface of said vessel for backing up said cylindrical metal mesh structure, said reinforcement and said cylindrical metal mesh structure being joined together at least at opposite ends thereof, there being at least one liquid flow path through said reinforcement, wherein a differential pressure between an inside and an outside of said filter structure is maintained by the inner surface of said vessel.

According to another aspect of the present invention there is a provided pressure crystallization equipment mentioned above, wherein the filter structure and the vessel have a thermal insulating layer interposed therebetween, or wherein the inner surface of the filter structure is shaped like a truncated cone divergent toward the open end of the vessel, or wherein the vessel is communicated with a nozzle arrangement in the discharge path, the nozzle arrangement comprising a nozzle having a smaller diameter than that of the discharge path, or wherein the discharge path has an insulation-clad heater.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 6:
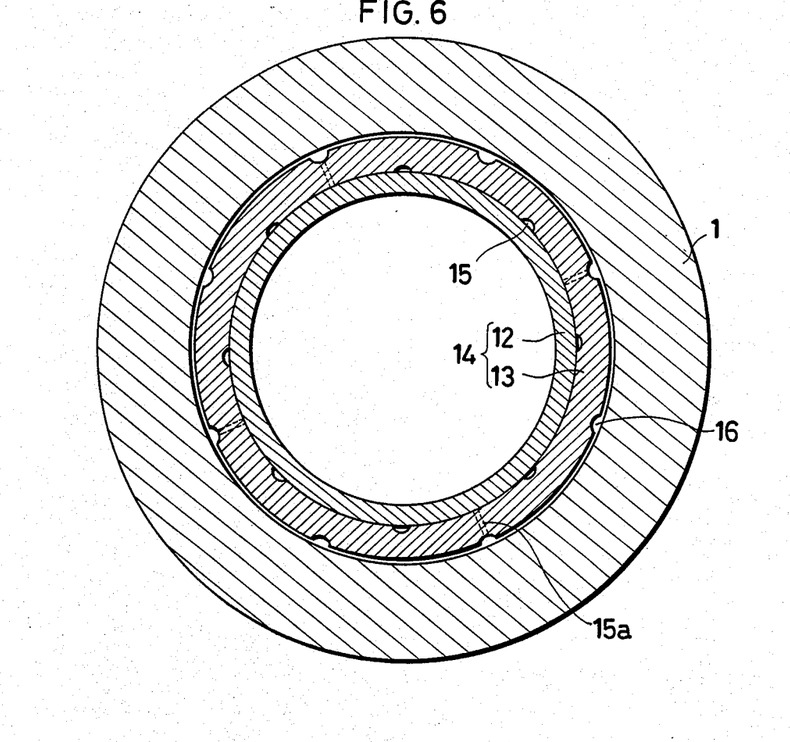
FIG. 6 is a horizontal cross-section showing a filter structure used in the pressure crystallization equipment.

Referring to FIG. 6 the pressure crystallization equipment of the present invention includes a cylindrical metal mesh layer structure 12, and a cylindrical reinforcement 13 provided concentrically of the mesh layer structure 12 so as to back it up. The two members 12 and 13 are joined to each other at least at their opposite ends, and preferably a solid phase diffusion joint layer is interfacially provided therebetween, and the two members 12 and 13 will be referred to jointly as the filter structure 14. The filter structure 14 is fixed axially and radially on the wall of a vessel 1. The filter structure 14 can be fixed in a known manner; for example, by means of rings 9 shown in FIGS. 3 and 4. In the radial direction the filter structure 14 is kept in contact with the inside surface of the vessel 1 with a minimum gap such as 0.1 mm or less.

The filter structure 14 is intended to allow a liquid to pass from inside to outside, and the liquid is collected at the bottom of the vessel 1 for discharge out of the equipment. A more detailed description will be given below:

The filter structure 14 includes two or more cylinders of metal mesh arranged concentrically, prefereably each cylinder having different mesh size from the other's; for example, the inner cylinder having a fine mesh whereas the outer one having a course mesh, and when three cylinders are used, the middle one has a finer mesh. The cylinders are firmly fixed to each other so as to withstand a stress axially acting thereon, thereby avoiding a possible interfacial displacement. However it is necessary to allow gaps to exist in between the adjacent mesh cylinders in that the gaps are necessary to allow the liquid to pass through, wherein the gaps are produced owing to the wavy forms of the individual wires constituting the metal mesh. Usually the metal mesh cylinders are joined to each other by sintering, and the sintering conditions, such as sintering pressure and temperature, are determined in accordance with the diameter of the constituent wires, the mesh size, and the nature of the material.

The reinforcement 13 is designed to support the metal mesh cylinder so that the cylinder 12 is protected against an axial and radial force acting thereon. The reinforcement 13 is made by machining a metal block and further is provided by machining a path allowing a liquid to pass through, the path leading from inside to outisde and communicating with a discharge pipe. It is preferred that the diameter of the reinforcement is such as to allow a small gap to be present against the outside surface of the vessel.

As described above it is essential to join the metal mesh layer structure 12 and the reinforcement 13 is firmly as to withstand an axial force and a radial force acting thereon, and in order to secure the joint they can be soldered to each other in place along the lengths thereof. Thus they are protected against a possible fructure or displacement. Solid phase diffusion bonding can be preferred, which can be effected by sintering. The diffusion sometimes spreads to cover the liquid paths mentioned above, and to avoid it grooves 15 are formed axially or circumferentially. The grooves can guide the liquid from inside the structure 12 into second grooves 16 by way of by-passes 15a. Finally the liquid can be discharged in the same manner as mentioned above with reference to FIG. 1. In the illustrated embodiment the grooves 15 and 16 are produced in the reinforcement 13.

It is important to locate the two members 12 and 13 exactly with respect to the vessel 1. The small gap between the reinforcement 13 and the vessel 1 is helpful to maintain them in the radial direction. In the axial direction a spacer (not shown) can be provided to that the inner heights of the vessel 1 and the reinforcement 13 are made equal. If either member is dislocated with respect to the other they are liable to radial or axial stress possibly acting thereon owing to the high pressure, thereby damaging the equipment and/or endangering the operator engaged in operating the equipment.

The exact location of the filter structure 14 is important in that the space defined by the filter structure must be concentric of the axis of the piston. Another consideration is that the filter structure tends to expand radially during filtration and squeezing under the high pressure or a high pressure differential. To avoid the radial expansion the filter structure 14 is placed in contact with the inside of the vessel 1 with the minimum space interposed therebetween so as to stop the filter from expanding outside. When the liquid phase is withdrawn the filter 14 contracts thereby to squeeze the solid cake. But under the structure of the present invention this problem is avoided or minimized. For this purpose the space between the filter structure and the vessel is preferably 0.1 mm or less. The embodiment shown in FIG. 4 is effective to achieve this purpose, that is, the filter structure 14 is tapered with a cotter-like spacer interposed between the filter and the vessel so as to tighten the filter structure or alternatively the vessel is tapered whereas the outside of the filter is shaped like a truncated cone, so that the vessel and filter are arranged concentrically so as to be complemental with each other. Either can be adopted.

Figure 8:
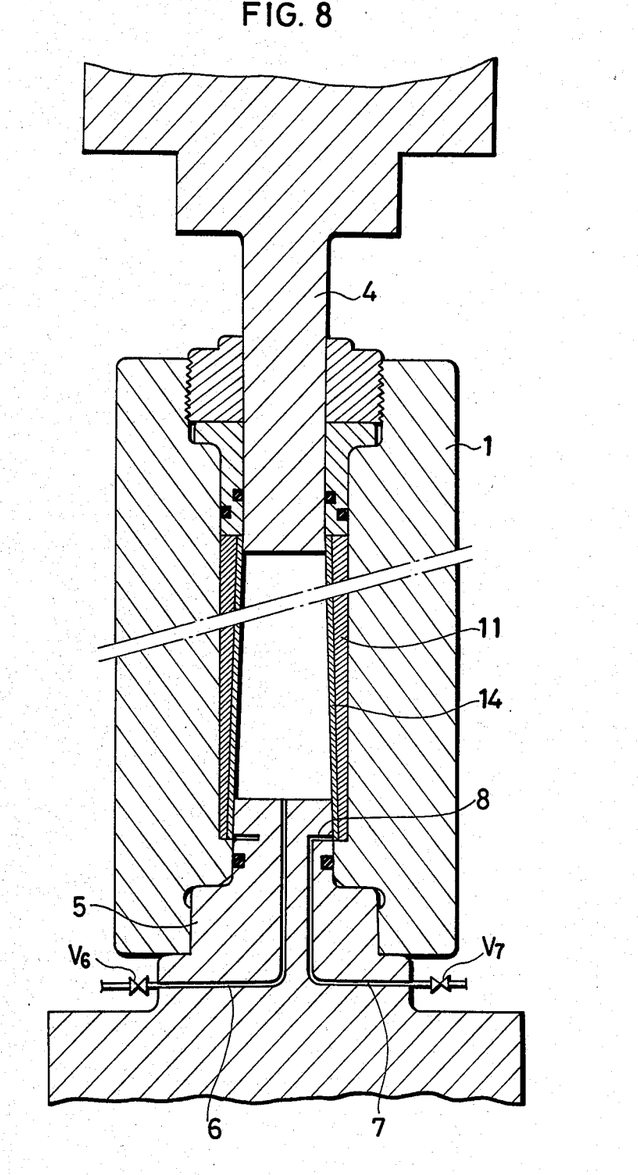
FIG. 8 is a vertical cross-section through pressure crystallization equipment embodying the present invention.

FIG. 8 shows an example of the equipment for achieving the above mentioned purpose. The vessel 1 is provided with a spacer 11 having a tapered wall, and a filter structure 14 having an equally tapered wall so that the filter structure 14 is exactly and firmly located with respect to the vessel 1.

In the embodiment shown in FIG. 8 the blocks 5 and 5a are detachable, which facilitates the supply of the filter structure and the removal of the contents from the vessel.

Figure 7:
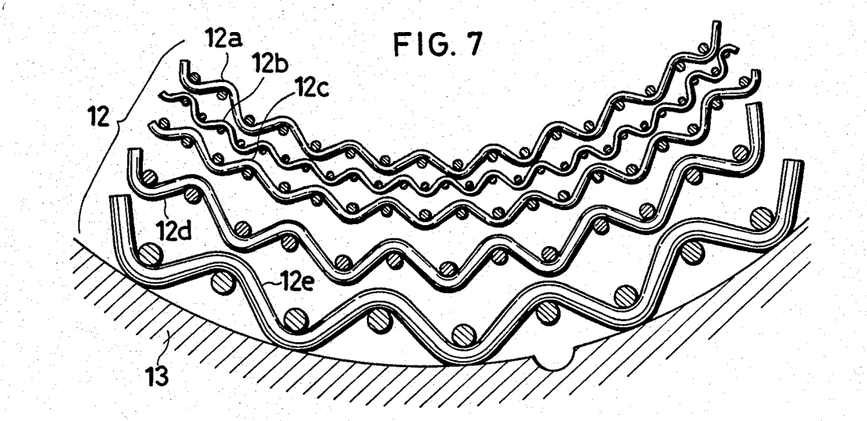
FIG. 7 is a horizontal cross-section showing the filter structure used in the pressure crystallization equipment of the present invention.

FIG. 7 is a rough view showing the structure of the filter structure 14, wherein the reference numerals 12a to 12e denote metal mesh bodies all of them constituting the unitary layers structure 12, which is surrounded with the reinforcement 13. Functionally the layer 12b of the finest mesh size plays as a filter whereas the others work as supports for the layer 12b and provided routes for allowing the liquid to pass through.

Figure 9:
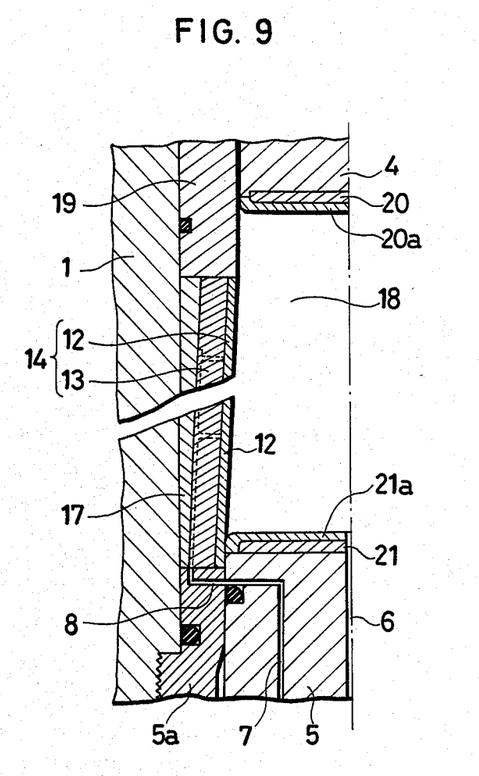
FIG. 9 is a vertical cross-section showing an embodiment including an insulating layer.

Referring to FIG. 9 another example of the preferred embodiments will be described:

There is provided a thermal insulating partition 17 between the vessel 1 and the filter structure 14, thereby preventing heat from transferring to the vessel 1, wherein the heat is likely to be generated at the inside of the filter structure 14. In the illustrated embodiment the filter structure 14 is provided in a lower section of the cylinder but it can be provided along the entire height thereof. When the filter structure 14 is provided in the lower section thereof as shown in FIG. 9, there is provided an insulating spacer 19 between the vessel 1 and a high pressure chamber 18, thereby protecting the collecting product against heat. In addition the filter structure 14 is firmly fixed in position. The reference numerals 20 and 21 denote insulating members adapted to prevent heat from transferring to the main section of the equipment; preferably they are provided with filter members 20a and 21a, respectively. A plug 5a is made in one piece with the vessel 1, and other parts are detachably fixed to their positions so as to allow the solid cake to be readily taken out.

Under the present invention the vessel is insulated against heat from the products in the cylinder, and particularly the transfer of heat in all directions from the filter structure 14 is prevented. This reduces the heat capacity of the filter structure 14. This is effective to avoid the production of temperature gradient between the inner surface of the filter structure and the central portion thereof. As a result the solid cake is kept at a constant temperature throughout it. This leads to the high purity of the products. Under the conventional practice with the decrease in the temperature of the product sticking to the inner surface of the filter, other content than the desired one crystallizes and results in (1) the reduced purity of the product and (2) the lost filtering ability die to clogging troubles in the inner surface of the filter. Under the present invention these problems have been avoided or minimized.

For the insulating material bakelite or epoxy resins can be selectively used but there is no limitation to the material if it has some elasticity, has a compressible strength and has a chemical resistivity to the treating content. The insulating material is variously shaped in accordance with the position at which it is located. Basically it is shaped so as to allow the liquid to pass therethrough and flow downward toward the bottom of the equipment. The thickness of the insulating material is determined in accordance with the operational condition. Alternatively it is possible to cover the reinforcement with an insulating film. (Of course, whenever thermal insulation is not needed, partition 17 may be made of metal.)

Next, the method of drawing the liquid from the vessel to a point where it is under the atmospheric pressure through the filter structure with the use of a nozzle will be described:

The liquid from the discharge pipe is immediately exposed to a low pressure, but upstream of the nozzle a high pressure is maintained. Therefore the filtering operation can be finished while the solid phase can be kept at the high pressure. This is one advantage derived from the use of a divergent nozzle. In general when a squeezing force is applied to a solid and liquid coexisting phase so as to force out the mother liquid through the filter structure, a greater part of the mother liquid is caused to pass through the filter structure at the initial state of the squeezing process because of having no obstacle on and around the surface of the filter structure 14. As the squeezing advances, crystallized solids gather thereon, thereby increasing the resistance to the filtering. Toward the end of the squeezing process the amount of the filtrate considerably lessens. In this way the amount of filtrate is reduced with time, which means that the amount of the liquid passing through the nozzle is gradually reduced. In the process of squeezing and filtering the high pressure chamber is full of crystallized solids, which gather on the surface of the filter structure and prevent the mother liquid from discharging therefrom. As a result the fresh solid cake is not pure enough.

The inventors have devised to control the high pressure in the process of squeezing and filtering so as to allow the mother liquid to pass through the filter as much as possible. Under this device the amount of the high pressure liquid continues to lessen, and the discharge pressure equally continues to reduce from the start of squeezing up to the end thereof in irregular patterns.

Because of the complicated changes in resistivity of the high pressure liquid prior to filtering it is essential to control such varying resistances so as to achieve the desired results. One solution is to provide a control valve in the discharge line, whereby the resistance of liquid flow is controlled with time and pressure. However this method has disadvantages; for example, (1) the control of flow rate must be carried out in a short time, (2) the follow-up troubles due to changes in the liquid pressure and (3) the troubles proper to the valve.

In order to overcome the problems pointed out above the inventors have devised to use a divergent nozzle whereby the resistance or the rate of flow is controlled. The diameter of the nozzle is an important factor which affects the control of the flow rate. If it is too large the flow rate naturally becomes too large, thereby causing the crystallized fine crystals to flow out, and also leading to the reduced pressure in the vessel (which means that the pressure for driving the piston becomes insufficient). To avoid the reduction of pressure it is required to use a great power. Whereas, if the diameter is too small the flow rate becomes too small, thereby prolonging the operation time for squeezing and filtering. It is important to determine an optimum diameter of the nozzle so as to be in accord with the progress of squeezing and filtering operation, which is evident from the following equation:

$$V = a\sqrt{2gH}$$

wherein:
V: the rate of flow ejecting through the nozzle under pressure
a: coefficient
g: gravitational acceleration
H: the pressure of the liquid being discharged, expressed in terms of water head It will be understood from the above equation that it is required to replace one nozzle with another in accordance with the rate of flow to be desired. In this case the maximum diameter depends on the capacity of the equipment to produce pressure, and more specifically, the hydraulic power must be such as to compensate for the deficiency in pressure due to the flow-out of liquid. The diameter D of the nozzle is expressed by the following equation:

$$W \geq P \Delta V = P \cdot \frac{\pi}{4} D^2 V$$

$$\therefore D \leq 2\sqrt{\frac{W}{\pi \cdot P \cdot V}}$$

wherein:
W: the driving energy of the hydraulic pump
P: pressure
ΔV: the amount of flow-out liquid per unit time
V: the rate of flow By replacing one nozzle with another in accordance with the rate of flow to be desired the speed at which the separation is effected is adjusted. However it is troublesome to replace the nozzles frequently and during replacement the liquid is allowed to flow out, thereby resulting in the waste in liquid.

Figure 10:
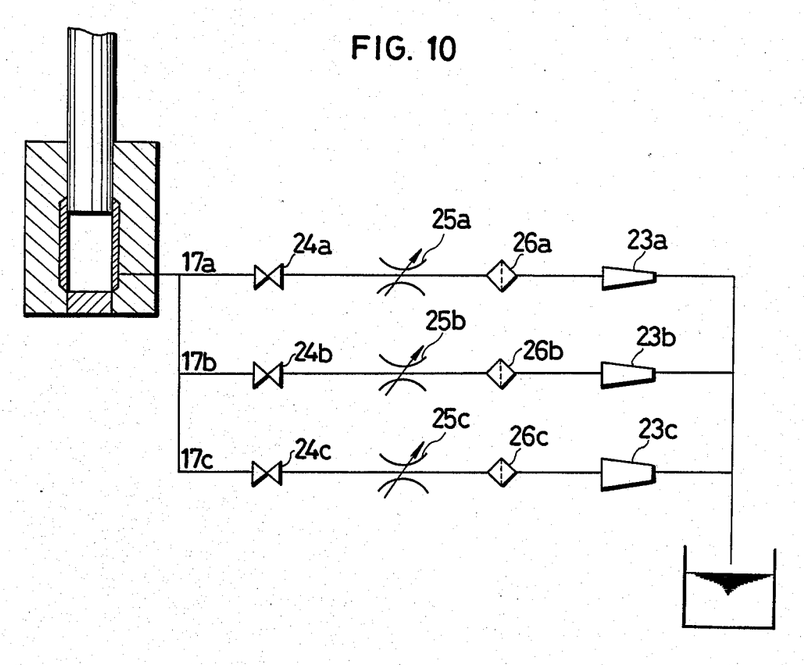
FIG. 10 is an explanatory view exemplifying a discharge path including a nozzle arrangement.

The inventors have provided an arrangement of a plurality of discharge pipes 17 as shown in FIG. 10 in which three paths 17a, 17b, and 17c are provided each including nozzles 23a, 23b and 23c having different diameters, respectively. The reference numerals 24a, 24b and 24c denote elecromagnetic valves whereby the discharge path is automatically selected. The nozzle is selected by selecting the valve 24a, 24b or 24c in accordance with the flow rate to be desired. There are provided throttle values 25a, 25b and 25c upstream of the nozzles 23a 23b and 23c (if so desired, downstream thereof), which work in cocoperation with the respective nozzles 23a, 23b and 23c. The reference numerals 26a, 26b and 26c denotes filters, whereby the nozzles are protected against clogging. The liquid ejected through the nozzle has a large kinetic energy, and it is necessary to attenuate the kinetic energy as soon as possible so as to secure operational safety.

Figure 11:
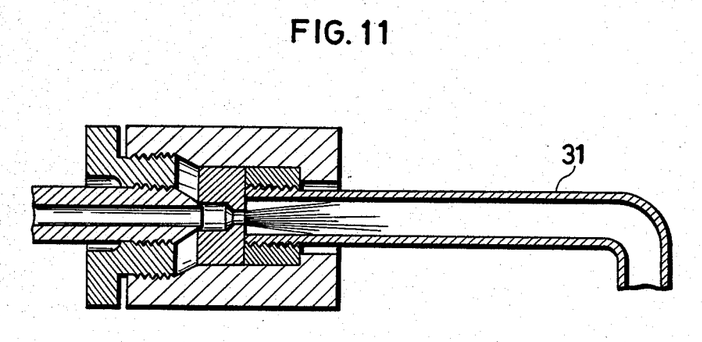
FIG. 11 is a cross-section on a larger scale of the nozzle arrangement of FIG. 10.

FIG. 11 shows an embodiment which includes ducts 31 provided downstream of the nozzles, the ducts having a relatively large diameter with respect to that of each nozzle. The duct is designed to absorb the kinetic energy by friction between the flow of liquid and the inside wall of the duct, whereby reducing the rate of flow to a safe speed.

Under the present invention it is possible to add any other auxiliary device to the arrangement shown in FIG. 10, and also to change the lengths of the ducts within the spirit of the invention. The diameter of the nozzle tends to enlarge by wear over a long period of use. Replacement is required but as the nozzle is a small component part the price is low and the replacing work is easy. Without the use of a large-scale equipment with withdrawal of the high pressure liquid to the low pressure section is achieved in an optimum situation.

Figure 12:
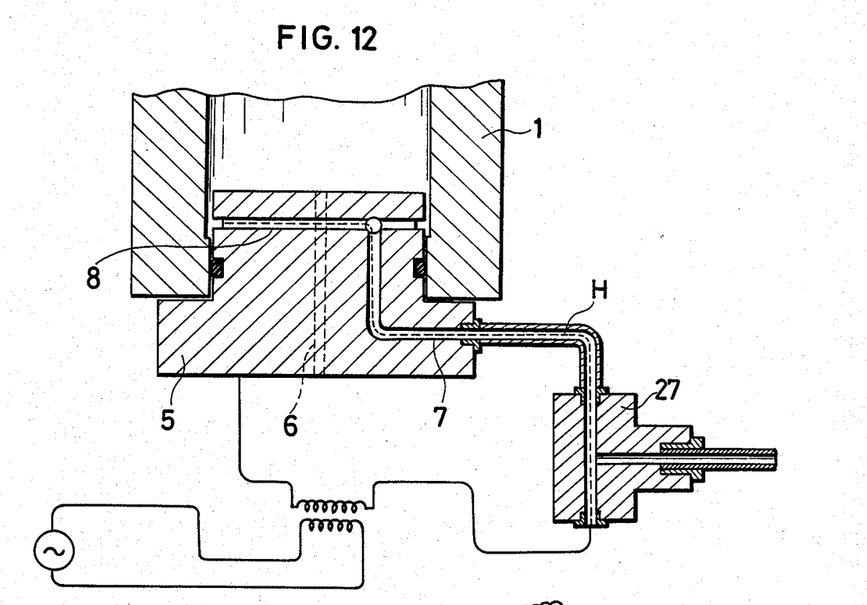
FIG. 12 is a vertical cross-section showing an embodiment including a heating element in the discharge path.
Figure 13:
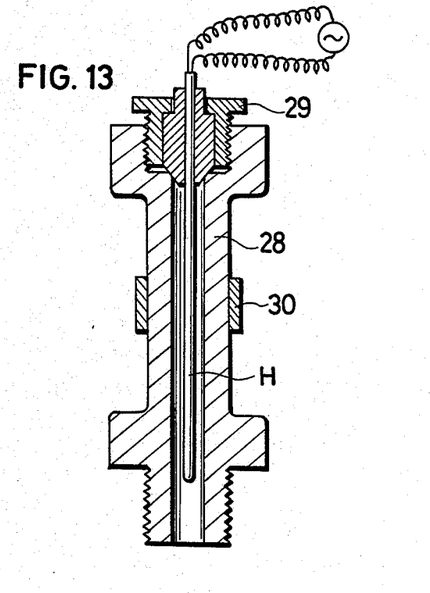
FIG. 13 is a vertical cross-section showing an embodiment including a heating element in the pressure gauge.

FIG. 12 shows an embodiment which incorporates a heating device located in the discharge path, which will be described in detail:

The reference character H denotes a heater of sheath type located in the discharge paths 7 and 8 along the full length thereof. The heater H is inserted into the pipes 7 and 8 from a three-way coupling 27, wherein the terminating end of the heater H is electrically connected to the source of electricity directly or indirectly, that is, through the block 5. The other terminating end of the heater H is soldered to the three-way coupling 27, and a lead line is provided for connection to the source of electricity. The coupling 27 is also connected to the valve V7 (FIG. 1). A current constantly flows through the heater H, thereby keeping the paths 7 and 8 warm. This is effective to prevent the liquid flowing therethrough from solidifying, thereby avoiding a clogging trouble. Likewise a heater can be provided in the supply path 6, thereby preventing the supplying liquid from solidfying. A pressure gauge can be provided in the section where no clogging is wanted, whereby the rise and drop in pressure is visually watched. A pressure gauge itself is essential to the equipment of the present invention but a high pressure acts within the pressure gauge, thereby causing the liquid flowing therethrough to solidify. When the liquid solidifies in the pressure gauge it becomes difficult to obtain an accurate information about the pressure. The present invention has solved this problem. Referring to FIG. 13 to solution will be described in detail:

The reference numeral 28 denotes a pressure gauge unit which includes a heater of sheath type fixed by a fixing member 29, and the reference numeral 30 denotes a strain gauge designed to detect the pressure.

In this way heaters of sheath type are provided in the section where the solidfying of liquid is not desired. The arrangement of heaters can be used in association with the pressure crystallization equipment of the invention, thereby securing the increased efficiency. Since the heaters are of a sheath type there is no difficulty in providing them. The heaters are provided in the liquid paths alone, thereby avoiding heating the entire equipment, particularly the chamber where the crystallization takes place.

INDUSTRIAL APPLICABILITY

As evident from the foregoing description the filter structure is protected against becoming damaged in the process of squeezing and filtering after the crystallization has taken place, thereby separating the particular solidified content from the remaining liquid. Because of the facility and operational economy the pressure crystallization equipment of the present invention is applicable to industrial purposes.

Obviously, numerous modifications and variations of the present invention are possible in light of the above teachings. It is therefore to be understood that within the scope of the appended claims, the invention may be practiced otherwise than as specifically described herein.

What is claimed is:

1. Pressure crystallization equipment comprising:

a cylindrical high pressure vessel having an inner surface;

means for establishing a pressure of at least 500 atmospheres within said vessel; and a filter structure disposed within said vessel and being fixed against substantial radial and axial displacement with respect to said vessel, said filter structure comprising a cylindrical metal mesh structure having at least two layers of mesh sintered together and a reinforcement disposed between said cylindrical metal mesh structure and said inner surface of said vessel for backing up said cylindrical metal mesh structure, said reinforcement and said cylindrical metal mesh structure being joined together at least at opposite ends thereof, there being at least one liquid flow path through said reinforcement, wherein a differential pressure between an inside and an outside of said filter structure is maintained by the inner surface of said vessel.

2. Pressure crystallization equipment as defined in claim 1, further comprising an insulating layer between the filter structure and the vessel.

3. Pressure crystallization equipment as defined in claim 2, wherein the filter structure and the insulating layer are spaced from each other with a gap of 0.1 mm or less, and wherein the insulating layer and the vessel are spaced from each other with a gap of 0.1 mm or less.

4. Pressure crystallization equipment as defined in any of the claims 1, 2, 5 or 3, further comprising a solid phase diffusion layer interfacially produced between the cylindrical metal mesh layer structure and the cylindrical reinforcement.

5. Pressure crystallization equipment as defined in claim 1, wherein the filter structure and the vessel are spaced from each other with a gap of 0.1 mm or less.

6. Pressure crystallization equipment as defined in claim 1, wherein an inner wall surface of the filter structure is shaped like a truncated cone divergent toward an open end of the vessel.

7. Pressure crystallization equipment as defined in claim 1, wherein the vessel comprises a cylindrical body section and a bottom closure, the body section and the bottom closure being relatively shiftable to the vessel for attaching and detaching the bottom closure.

8. Pressure crystallization equipment as defined in claim 1, further comprising a nozzle arrangement in a discharge line communicating with a discharge path of the vessel.

9. Pressure crystallization equipment as defined in any of the claims 1 or 8, further comprising a heating element of sheath type clad with electrical insulation and disposed in liquid paths which are subjected to high pressure.

* * * * *